US012555726B2

(12) United States Patent
Brocklesby et al.

(10) Patent No.: US 12,555,726 B2
(45) Date of Patent: Feb. 17, 2026

(54) INFORMATION HANDLING SYSTEM KEYBOARD EMBEDDED MICRO LED BACKLIGHT

(71) Applicant: Dell Products L.P., Round Rock, TX (US)

(72) Inventors: Brandon J. Brocklesby, Pflugerville, TX (US); Jason S. Morrison, Chadron, NE (US); Priyank J. Gajiwala, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 176 days.

(21) Appl. No.: 16/940,599

(22) Filed: Jul. 28, 2020

(65) Prior Publication Data

US 2022/0037101 A1    Feb. 3, 2022

(51) Int. Cl.
*H01H 13/83* (2006.01)
*G06F 3/02* (2006.01)
*H01H 13/703* (2006.01)
*H01H 13/704* (2006.01)
*H01H 13/705* (2006.01)

(52) U.S. Cl.
CPC ........... *H01H 13/83* (2013.01); *G06F 3/0202* (2013.01); *H01H 13/703* (2013.01); *H01H 13/704* (2013.01); *H01H 13/705* (2013.01); *H01H 2219/036* (2013.01); *H01H 2219/056* (2013.01)

(58) Field of Classification Search
CPC .... H01H 13/83; H01H 13/703; H01H 13/704; H01H 13/705; H01H 2219/036; H01H 2219/056; H01H 2219/014; G06F 3/0202; G06F 1/1616; G06F 1/1662; G06F 3/02
See application file for complete search history.

(56) References Cited

U.S. PATENT DOCUMENTS

| | | | |
|---|---|---|---|
| 7,525,056 B2 * | 4/2009 | Chiba | H01H 13/83 200/314 |
| 8,035,653 B2 | 10/2011 | Tsai | |
| 8,592,702 B2 | 11/2013 | Tsai | |
| 8,785,796 B2 | 7/2014 | Bronstein et al. | |
| 8,890,013 B2 * | 11/2014 | Ozias | H01H 13/023 200/310 |
| 8,890,720 B2 | 11/2014 | Shipman et al. | |
| 9,521,352 B2 | 12/2016 | Ezequiel | |
| 9,529,501 B2 | 12/2016 | Hoerentrup et al. | |
| 10,128,307 B2 | 11/2018 | Chang | |
| 10,381,176 B2 | 8/2019 | Peterson et al. | |
| 10,410,807 B2 * | 9/2019 | Tsai | G02B 6/0055 |
| 10,879,019 B2 | 12/2020 | Zercoe et al. | |

(Continued)

Primary Examiner — Lheiren Mae A Caroc
(74) Attorney, Agent, or Firm — Zagorin Cave LLP; Robert W. Holland

(57) ABSTRACT

Information handling system keyboard illumination is provided with micro LEDs disposed below keyboard keys to direct illumination at each key individually. The micro LEDs may be integrated at a bottom surface of a support plate below a keyboard membrane, on top of the support plate within an opening of the membrane or in a spacer layer of the membrane between circuit layers. A diffuser disposed between the micro LED helps to diffuse illumination directed at the key for a more even icon illumination. The diffuser may be integrated with the membrane at an upper circuit layer or over a structure disposed over the micro LED.

2 Claims, 5 Drawing Sheets

(56) References Cited

U.S. PATENT DOCUMENTS

2009/0103964 A1* 4/2009 Takagi ................. H01H 3/125
                                                                            400/495
2009/0201420 A1   8/2009 Brown et al.
2014/0138228 A1* 5/2014 Chen ................... H03K 17/98
                                                                           200/5 A

* cited by examiner

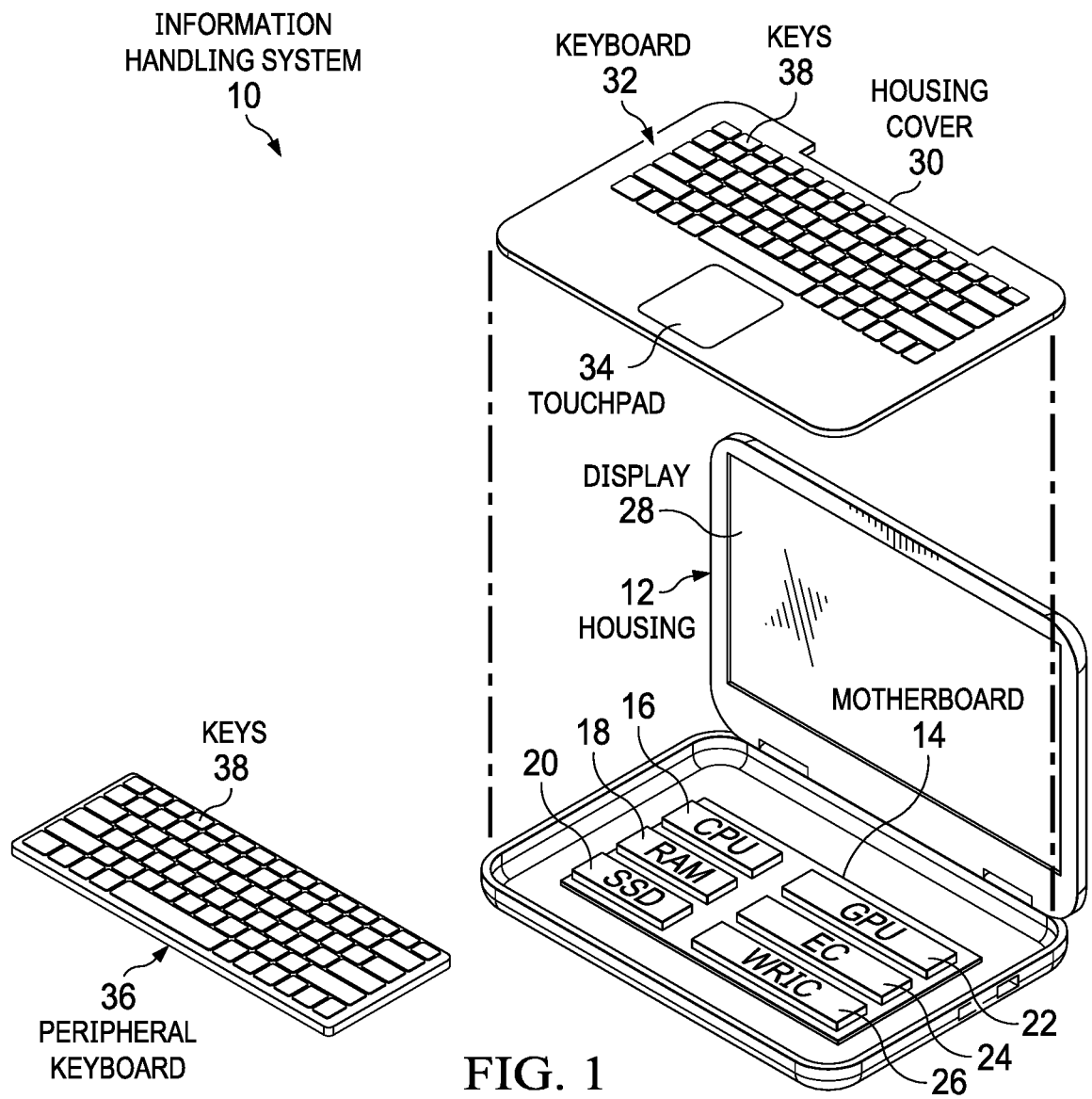
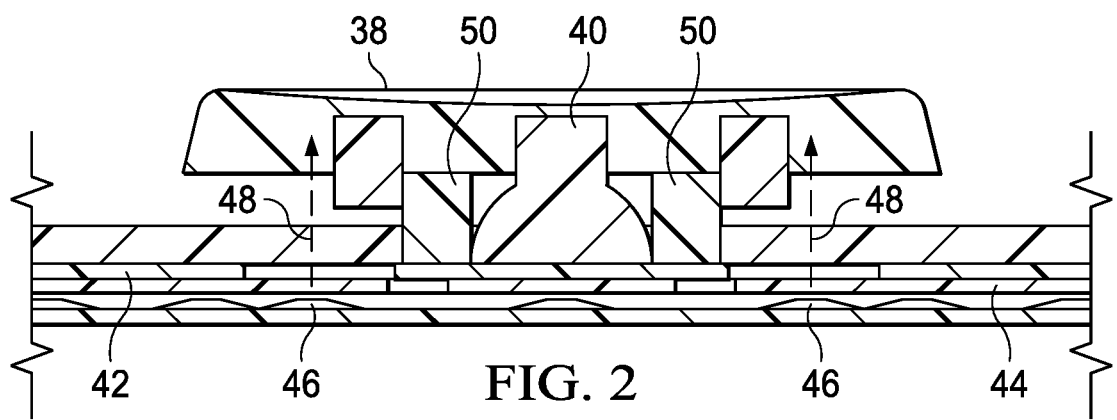

INFORMATION HANDLING SYSTEM KEYBOARD EMBEDDED MICRO LED BACKLIGHT

BACKGROUND OF THE INVENTION

Field of the Invention

The present invention relates in general to the field of information handling system input devices, and more particularly to an information handling system keyboard embedded micro LED backlight.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Convertible information handling system configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

End users often interact with portable information handling systems in locations that have limited lighting. To aid end user interactions, integrated keyboards often include a backlight that illuminates the keyboard keys. Generally, conventional keyboard backlights have side-firing LEDs that direct illumination into a light guide disposed under the keyboard. Openings in the light guide direct illumination up towards the keyboard keys. One difficulty with such conventional backlights is that the light guide tends to increase the vertical height of the housing to provide room for the backlight beneath the keyboard. Another difficulty is that the backlight tends to use a good deal of power that can impact battery life of the system.

SUMMARY OF THE INVENTION

Therefore, a need has arisen for a system and method which integrates LEDs in a keyboard under keys for illumination of the keys.

In accordance with the present invention, a system and method are provided which substantially reduce the disadvantages and problems associated with previous methods and systems for illumination of keyboard keys. Micro LEDs illuminate each of plural keys from a membrane below each key, such as through an opening of a support plate disposed under the key, through the membrane, and/or through an opening of the membrane. A diffuser disposed between each micro LED and its associated key diffuses illumination for a more even illumination of an icon disposed at the key.

More specifically, an information handling system processes information with a processor and memory disposed in a housing. A keyboard integrated in the housing or interfaced as a peripheral device accepts end user presses at keys as inputs to the information handling system. To provide a backlight that illuminates keys of the keyboard, one or more micro LEDs are disposed in the keyboard under each key and directed upwards at the key so that illumination highlights an icon of the key, such as a number or letter associated with a key's press. In various embodiments, the micro LED is disposed under a support plate to illuminate through an opening of the support plate and through a membrane of the keyboard; through an opening of the support plate and into an opening of the membrane for a reduced vertical height; or integrated at a spacer layer of the membrane between circuit layers of the membrane. A diffuser disposed between the micro LED and key diffuses illumination to provide a more even key illumination and avoid hot spots. The diffuser may integrate with the membrane or couple to a separate structure that defines a pathway from the micro LED to the key.

The present invention provides a number of important technical advantages. One example of an important technical advantage is that keyboard keys are individually illuminated with micro LEDs directed up from a keyboard membrane to reduce keyboard height and reduce power consumption relative to conventional backlights having light guide structures. A diffuser integrated between the micro LED and key diffuses light to provide an even illumination. Integration of the diffuser with the membrane provides a low cost solution with ease of manufacture and no added keyboard height. Structures disposed at the micro LED can aid direction of illumination at the keys to avoid illumination hot spots to the side of a key and also support a diffuser between the key and micro LED.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 1 depicts an exploded view of a portable information handling system having an integrated keyboard with an embedded micro LED backlight;

FIG. 2 depicts a side cutaway view of an example embodiment of a keyboard backlight direct at a key with a micro LED;

DETAILED DESCRIPTION

Figure 3:
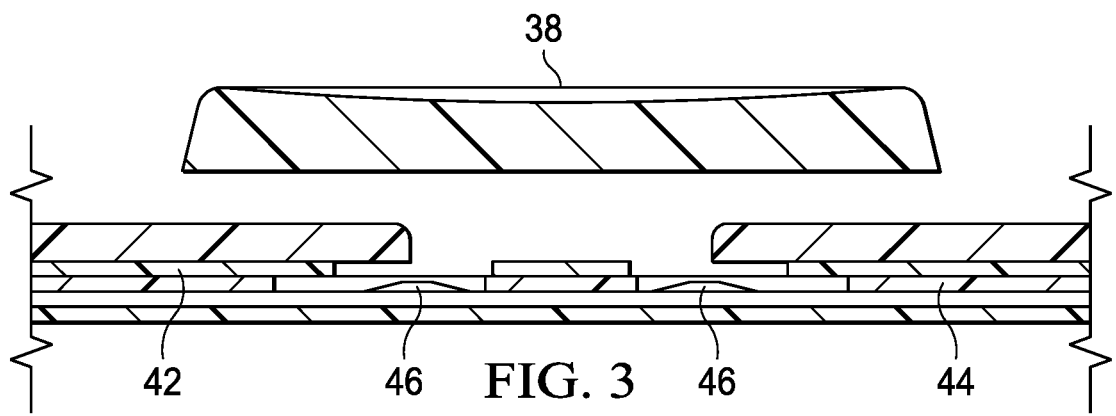
FIGS. 3 and 3A depict an example embodiment of key illumination by micro LEDs coupled below a support plate.

An information handling system keyboard backlight illuminates with micro LEDs embedded under the keyboard keys. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to FIG. 1, an exploded view depicts a portable information handling system 10 having an integrated keyboard 32 with an embedded micro LED backlight. In the example embodiment, information handling system 10 is built in a portable housing 12 that rotates housing portions between closed and open positions. A motherboard 14 couples in one portion of housing 12 to interface processing components that cooperate to process information. For example, a central processing unit (CPU) 16 executes instructions to process information with the instructions and information stored in a random access memory (RAM) 18. A solid state drive (SSD) 20 stores the instructions and information in non-transitory, such as for retrieval to RAM 18 at power up. A graphics processor unit (GPU) 22 interfaces with CPU 16 to process the information for defining visual images for presentation at a display 28 integrated in housing 12. An embedded controller 24 manages operating conditions at information handling system 10, such as power and thermal management, and interfaces with input devices, such as keyboard 32 and touchpad 34 integrated in a housing cover 30 that couples over the processing components. A wireless network interface card (WNIC) 26 supports wireless interfaces with external devices, such as a peripheral keyboard 36. Integrated keyboard 32 and peripheral keyboard 36 include keys 38 that accept end user touches as inputs, which are forwarded to CPU 16 by embedded controller 24. In the example embodiment, both integrated keyboard 32 and peripheral keyboard 36 include a backlight that illuminates keys 38 with micro LEDs disposed under keys 38 as described in greater detail below.

Referring now to FIG. 2, a side cutaway view depicts an example embodiment of a keyboard backlight directed at a key 38 with a micro LED 46. In the example embodiment, key 38 is biased upwards by a rubber dome 40 and has vertical motion managed by a scissors assembly 50. When an end user pushes down on key 38, an input is detected by a press against a membrane 42 that closes a circuit to send a signal through wirelines of the membrane to the embedded controller. A support plate 44 is disposed under membrane 42 to provide a surface against which a press to membrane 42 will close the input circuit. Micro LEDs 46 couple to the bottom surface of support plate 44 to provide illumination upwards towards key 38. For instance, micro LEDs 46 are disposed in a flexible printed circuit interfaced with the embedded controller, which manages illumination levels. Alternatively, micro LEDs 46 can be disposed on different types of substrates, such as an FPC or PET with silver traces or other similar interfaces. In the example embodiment, illumination proceeds though an opening formed in support plate 44 and through membrane 42.

Figure 3A:
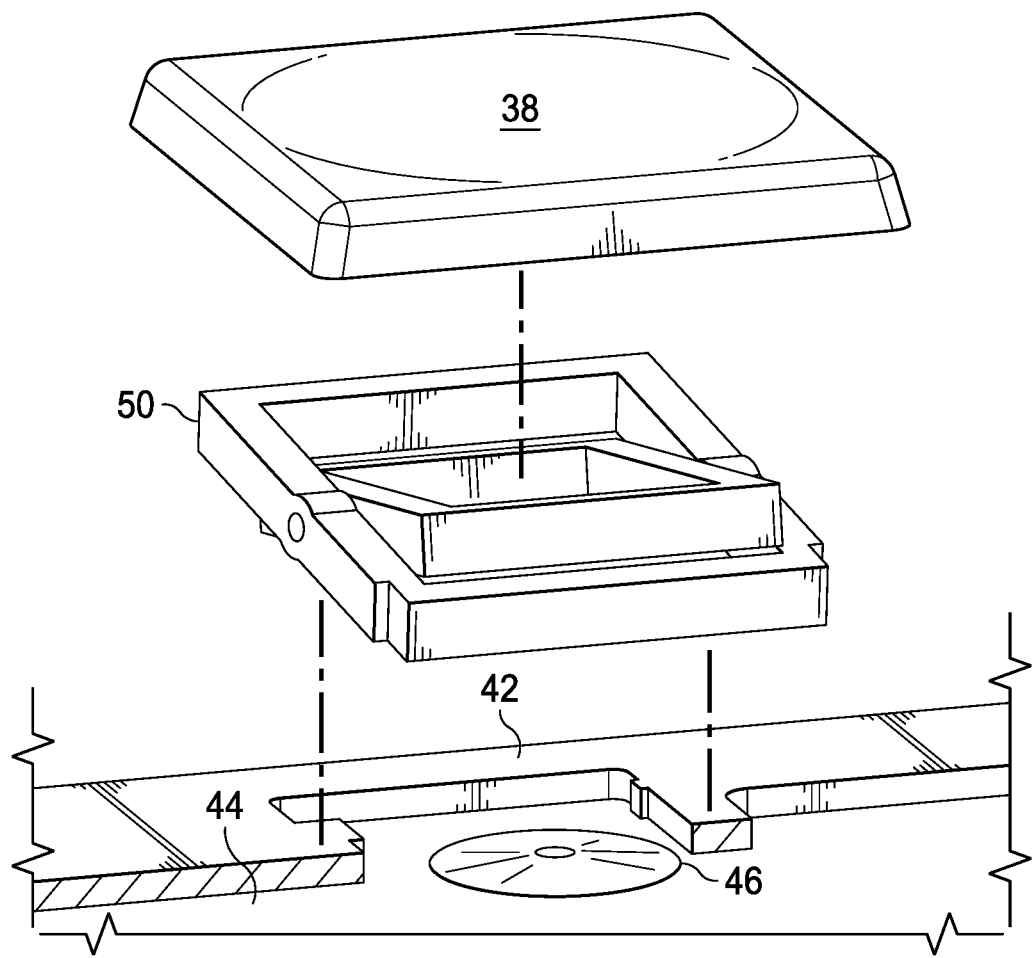

Referring now to FIGS. 3 and 3A, an example embodiment depicts key illumination by micro LEDs 46 coupled below a support plate 44. FIG. 3 depicts a side view of key 38 in a raised position over membrane 42 having an opening formed at the location of micro LEDs 46 so that micro LEDs 46 insert into the opening and reduce the vertical height of the keyboard, such as by 0.15 mm in the example embodiment. FIG. 3A depicts an upper perspective view of the opening formed in membrane 42 and support plate 44 where micro LEDs 46 extend upwards. As an example, the openings in support plate 44 may be punched through a steel or other metallic material while leaving a solid surface at which to place the scissors assembly.

Figure 4:
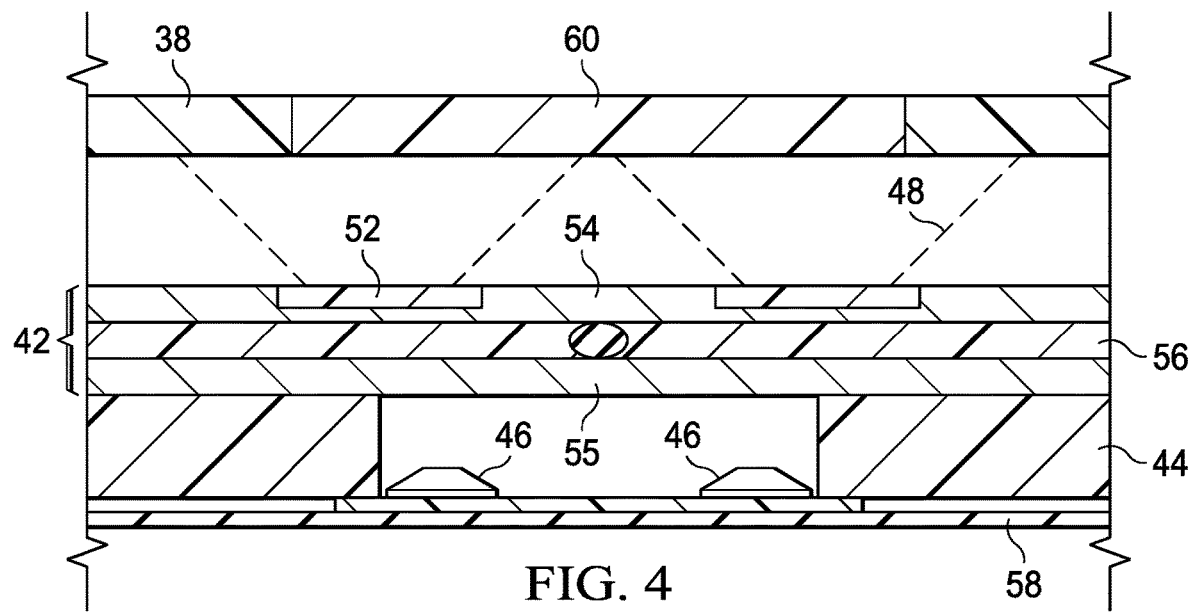
FIG. 4 depicts a side cutaway view of an alternative embodiment of key illumination through a diffuser.

Referring now to FIG. 4, a side cutaway view depicts an alternative embodiment of key 38 illumination through a diffuser 52. In the example embodiment, micro LEDs 46 couple to the lower surface of support plate 44 with a backlight membrane 58, such as a flexible printed circuit, and insert into an opening formed in support plate 44. Illumination from micro LEDs 46 proceeds upwards towards key 38 through membrane 42 with a goal of passing illumination through an icon 60 etched with transparent material in key 38 along the path indicated by lines 48. In order to provide a uniform illumination at icon 60, illumination from micro LEDs 46 pass through diffuser 52 to diffuse the light to a more even pattern. Diffuser 52 is, for example, a PET material integrated in membrane 42 that includes a diffusive property, such as a microstructure in an upper circuit board 54. Illumination passes through a lower circuit board 55 and a spacer 56 to provide diffusion without deposit of additional material over membrane 42. To support integration of the diffusion material, silver traces of membrane may be printed on the bottom side of the upper circuit layer 54. In an alternative embodiment, diffuser 52 may be included on the lower layer of circuit 55.

Figure 5:
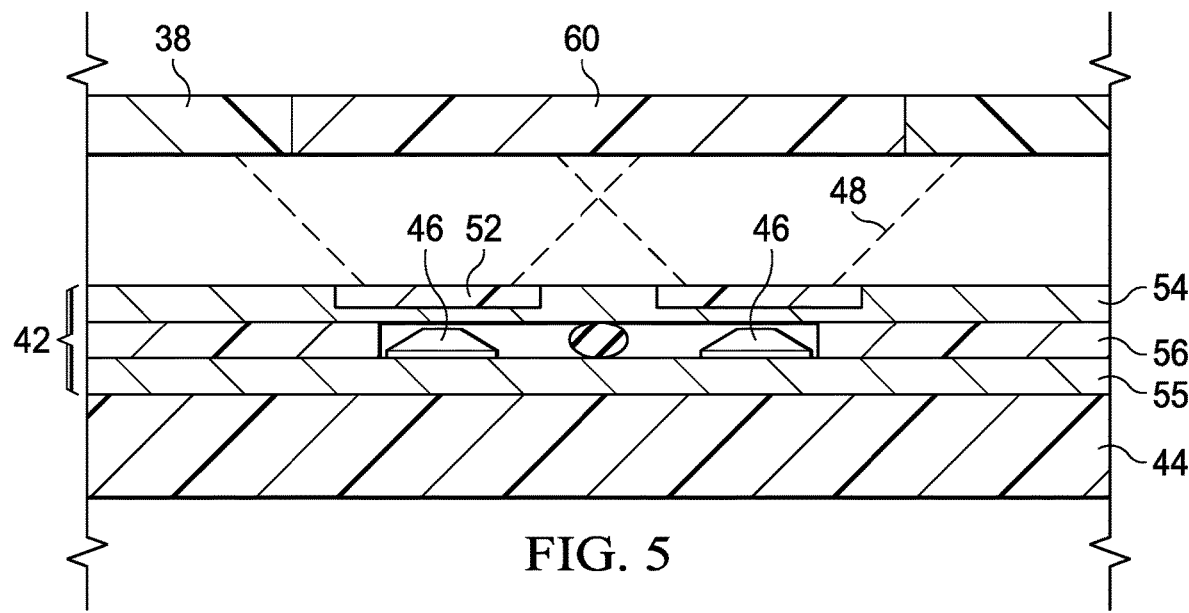
FIG. 5 depicts a side cutaway view of an alternative embodiment of key 38 illumination through a diffuser 52.

Referring now to FIG. 5, a side cutaway view depicts an alternative embodiment of key 38 illumination through a diffuser 52. In the example embodiment, micro LEDs 46 are integrated in membrane 42 at spacer layer 56 and illuminate upwards through diffuser 52 towards icon 60. Micro LEDs receive power, for example from wirelines integrated in membrane 42. Integration of micro LEDs 46 within membrane 42 provides thinner keyboard structure and a more robust support plate 44 since the openings for micro LEDs 46 used in other embodiments are not present. This allows a thinner support plate and reduces manufacture cost and complexity. Generally diffuser 52 softens hotspots that can be created by LED illumination to provide a more uniform glow at the key. One example of a diffuser is a pigment or additive to polycarbonate material used to form the membrane, such as titanium dioxide, zinc oxide, alumina, or silicon dioxide. The amount of diffuser material can vary between 0.001 and 1% depending upon the type of material and desired amount of diffusion. In addition, lower amounts of diffusion will typically reduce the amount of brightness and associated power use of the micro LEDs. During manufacture of the membrane, the diffuser material can be molded at locations of LEDs and/or CNC machined to different shapes and sizes. One example of a diffusion material is Lexan LUX9616G resin having a transmittance of 59% and haze/diffusion of 58% at 1 mm thickness.

Figure 6:
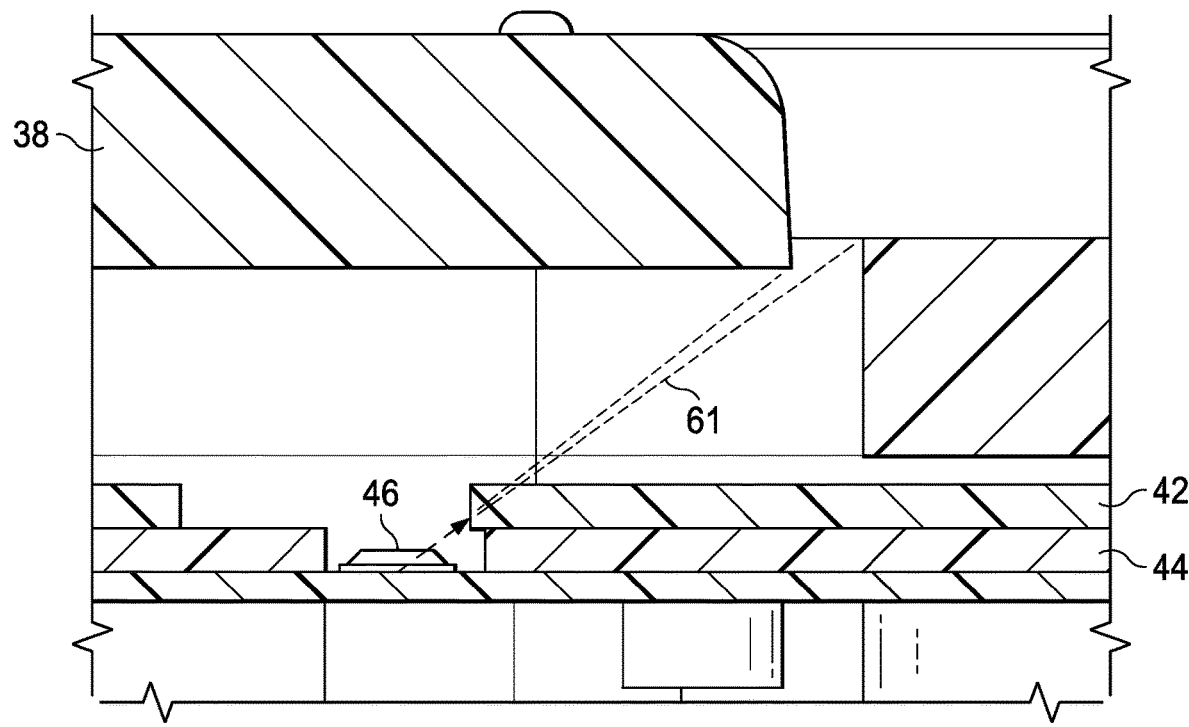
FIG. 6 depicts a side cutaway view of an alternative example of key illumination that reduces hot spots at the perimeter of a key.

Referring now to FIG. 6, a side cutaway view depicts an alternative example of key 38 illumination that reduces hot spots at the perimeter of keys 38. In some instance, illumination from micro LED 46 can escape from underneath key 38 to cause a bright spot from under key 38 that is directly visible to an end user, as illustrated by line 61. To block this undesired illumination hot spot, membrane 42 is formed to have an opening with a side surface that overlaps the location of micro LED 46 and blocks the path of illumination indicated by line 61. As an alternative to projecting membrane 42 over the side of the opening, a mask may be placed over the membrane at that location, such as tape.

Figure 7:
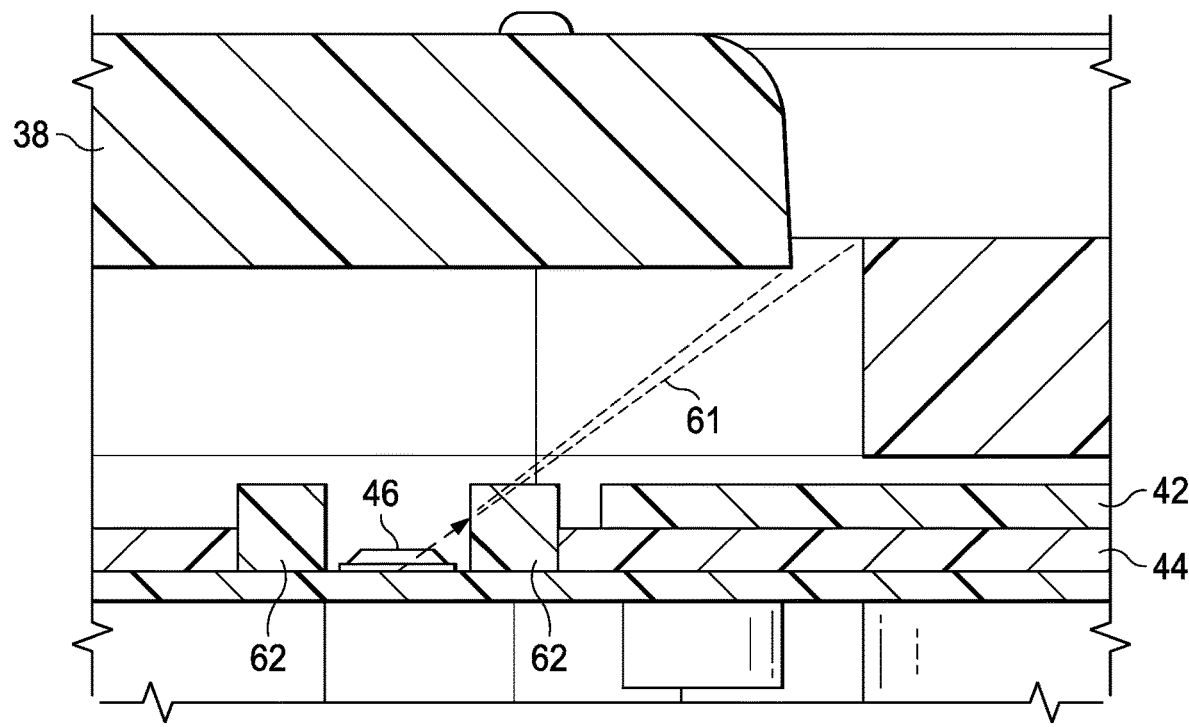
FIG. 7 depicts a side cutaway view of an alternative example of key illumination that reduces hot spots at the perimeter of a key.

Referring now to FIG. 7, a side cutaway view depicts an alternative example of key 38 illumination that reduces hot spots at the perimeter of keys 38. In the example embodiment, a structure 62, such as an overmold of plastic, is coupled to support plate 44 to extend up and around micro LED 46 and block illumination from proceeding along line 61. In the example, a structure 62 is placed at the front and rear of micro LED, however, structure 62 may have a circular shape around the entire opening or be located only at the front of key 38 in line with the location of an end user of the keyboard.

Figure 8:
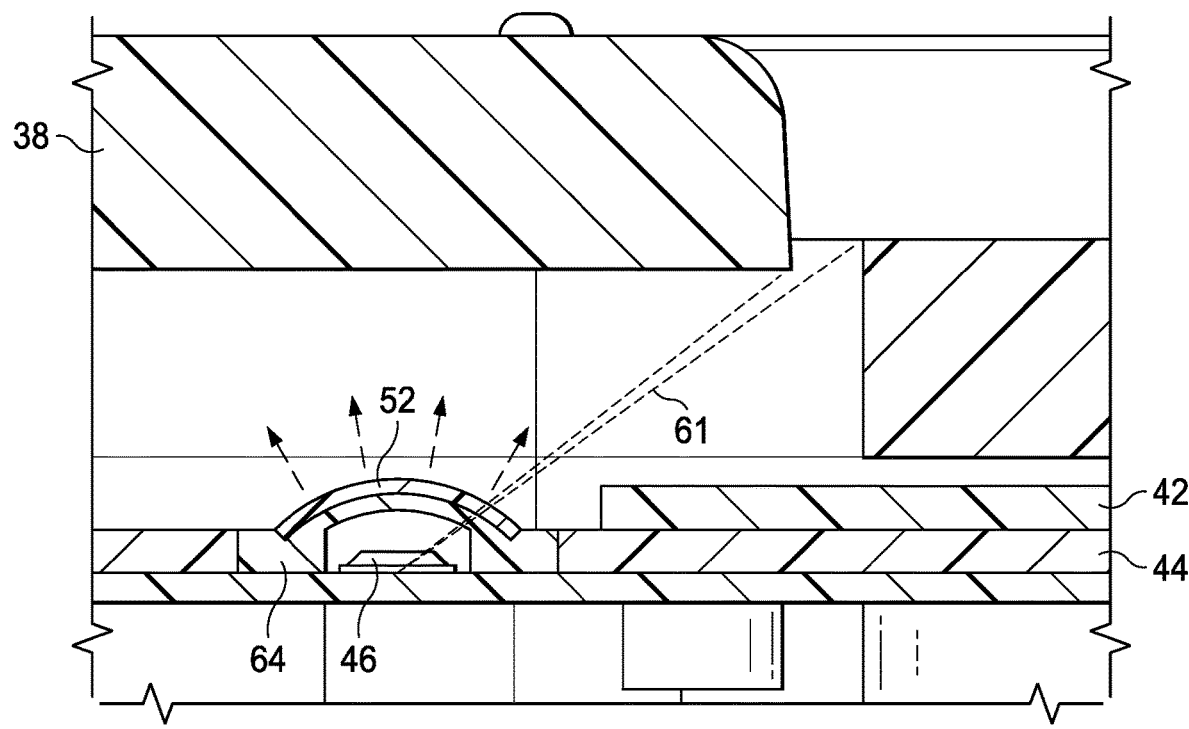
FIG. 8 depicts a side cutaway view of an alternative example of key illumination that reduces hot spots at the perimeter of a key.

Referring now to FIG. 8, a side cutaway view depicts an alternative example of key 38 illumination that reduces hot spots at the perimeter of keys 38. In the example embodiment, structure 64 encloses micro LED 46 with cover having a diffuser 52 integrated across the path of illumination. The example embodiment couples structure 64 on support plate 44 in an opening formed in membrane 42. In an alternative embodiment, structure 64 may couple over top of membrane 42 or be incorporated as a molded part in membrane 42.

Although the present invention has been described in detail, it should be understood that various changes, substitutions and alterations can be made hereto without departing from the spirit and scope of the invention as defined by the appended claims.

What is claimed is:

1. A keyboard comprising:
a support plate;
a membrane disposed on the support plate, the membrane having a flexible material with an upper and lower circuit layer configured to detect a key touch;
plural keys disposed over the membrane and operable to accept an end user touch to translate the touch as an input at the membrane;
an LED disposed under each key between the upper and lower circuit layer; and
a diffuser integrated in the membrane upper circuit layer and disposed at each LED to diffuse illumination towards the key, the illumination passing through the diffuser and the membrane flexible material.

2. An information handling system comprising:
a housing;
a processor disposed in the housing and operable to execute instructions that process information;
a memory disposed in the housing and interfaced with the processor, the memory operable to store the instructions and information;
an embedded controller disposed in the housing and interfaced with the processor, the embedded controller operable to accept inputs from input devices and communicate the inputs to the processor;
a keyboard interfaced with the embedded controller, the keyboard having plural keys, each of the plural keys accepting an input by a press at a membrane for communication to the embedded controller, the membrane having flexible material with an upper and lower circuit layer configured to detect a key touch, the keyboard further having plural light emitting diodes (LEDs) between the upper and lower circuit layer, each of the plural LEDs disposed below one of the plural keys, each of the plural LEDs directed up towards the one of the plural keys; and
a diffusion layer integrated in the membrane having a diffusive material;
wherein the diffusion layer aligns a diffusive material between each of the plural LEDs and the associated one of the plural keys, each of the plural LEDs illuminating the associated one of the plural keys through membrane flexible material and the diffusive material.

* * * * *